(12) United States Patent
Bailey

(10) Patent No.: US 12,162,453 B2
(45) Date of Patent: Dec. 10, 2024

(54) VEHICLE BRAKING CALIBRATION SYSTEM

(71) Applicant: Westinghouse Air Brake Technologies Corporation, Pittsburgh, PA (US)

(72) Inventor: Gary Lee Bailey, Frederick, MD (US)

(73) Assignee: Westinghouse Air Brake Technologies Corporation, Pittsburgh, PA (US)

( * ) Notice: Subject to any disclaimer, the term of this patent is extended or adjusted under 35 U.S.C. 154(b) by 537 days.

(21) Appl. No.: 17/498,476

(22) Filed: Oct. 11, 2021

(65) Prior Publication Data
US 2022/0135016 A1 May 5, 2022

Related U.S. Application Data

(60) Provisional application No. 63/107,865, filed on Oct. 30, 2020.

(51) Int. Cl.
| | | |
|---|---|---|
| *B60T 17/22* | (2006.01) | |
| *B60Q 9/00* | (2006.01) | |
| *B60T 7/12* | (2006.01) | |
| *B60T 8/92* | (2006.01) | |
| *B60T 15/02* | (2006.01) | |

(52) U.S. Cl.
CPC .............. *B60T 17/221* (2013.01); *B60Q 9/00* (2013.01); *B60T 7/12* (2013.01); *B60T 8/92* (2013.01); *B60T 15/028* (2013.01); *B60T 2270/406* (2013.01)

(58) Field of Classification Search
CPC .......... B60T 17/221; B60T 17/22; B60T 7/12; B60T 8/92; B60T 15/028; B60T 13/10; B60T 13/66; B60T 2270/406; B60Q 9/00
See application file for complete search history.

(56) References Cited

U.S. PATENT DOCUMENTS

| | | | |
|---|---|---|---|
| 6,901,789 B1 | 6/2005 | Fennel et al. | |
| 7,762,631 B2 * | 7/2010 | Smith | B60T 13/66 |
| | | | 701/19 |
| 9,340,195 B2 * | 5/2016 | Smith | B60T 17/228 |
| 9,709,081 B2 | 7/2017 | Sapoenza | |
| 2013/0032438 A1 | 7/2013 | Koons et al. | |

(Continued)

FOREIGN PATENT DOCUMENTS

| | | |
|---|---|---|
| CN | 1225448 A | 8/1999 |
| CN | 1846117 A | 10/2006 |

(Continued)

OTHER PUBLICATIONS

Examination Report No. 1 for corresponding AU Application No. 2021257908 dated Apr. 4, 2024 (7 pages).

(Continued)

*Primary Examiner* — Thomas J Williams
(74) *Attorney, Agent, or Firm* — K&L Gates LLP

(57) ABSTRACT

A vehicle braking calibration system and related method includes a valve fluidly coupled with a vehicle braking system of a vehicle. The valve is configured to move between an open position and a closed position to control an amount of a fluid that is directed out of the braking system. A sensor detects one or more characteristics of the fluid that is directed out of the braking system. A controller determines a state of the braking system based on the one or more characteristics of the fluid.

20 Claims, 3 Drawing Sheets

(56) References Cited

U.S. PATENT DOCUMENTS

| | | | |
|---|---|---|---|
| 2015/0025737 A1* | 1/2015 | Hermsen | B60T 17/221 |
| | | | 701/33.9 |
| 2015/0166033 A1 | 6/2015 | Kull et al. | |
| 2022/0135016 A1* | 5/2022 | Bailey | B60T 13/662 |
| | | | 701/29.2 |

FOREIGN PATENT DOCUMENTS

| | | |
|---|---|---|
| CN | 1950243 A | 4/2007 |
| CN | 101410283 A | 2/2013 |
| CN | 105465352 B | 12/2018 |
| CN | 109849680 A | 7/2019 |
| CN | 108001438 B | 8/2019 |
| WO | 2019096651 A1 | 5/2019 |

OTHER PUBLICATIONS

Office Action for corresponding CN Application No. 202111272834.4 dated May 31, 2023 (17 pages).

First Examination Report for corresponding IN Application No. 202114047160 dated May 17, 2022.

Office Action for corresponding Eurasian Patent Application No. 202192651 dated Oct. 6, 2022.

Office Action for corresponding CN Application No. 202111272834.4 dated Dec. 26, 2023 (18 pages).

\* cited by examiner

VEHICLE BRAKING CALIBRATION SYSTEM

CROSS-REFERENCE TO RELATED APPLICATIONS

This application claims priority to U.S. Provisional Application No. 63/107,865, filed Oct. 30, 2020, and is incorporated by reference herein in its entirety.

BACKGROUND

Technical Field

The subject matter described herein relates to a vehicle braking calibration system and related method.

Discussion of Art

Vehicle braking systems may be periodically checked to ensure that they are functioning correctly. For example, flow calibration and verification processes may be performed on braking systems, such as air brake systems. As one example of a verification process, a calibrated orifice may be attached to a brake pipe hose glad hand, and the brake pipe valve may be opened or closed to perform the verification process. This verification process requires an operator to move onboard and off-board the vehicle in order to perform different steps of the process. For example, the operator must be positioned at a location off-board of the vehicle to attach the orifice to the brake pipe hose glad hand, to manually open and close the brake pipe cut-out cock when instructed, and then remove the orifice from the glad hand. If it is determined that fluid that moves within the braking system does not meet certain criteria, maintenance and/or repair may be performed on the vehicle or braking system. Alternative verification processes may be needed to ensure safety to the operator, to increase an amount of time between verification processes, and to reduce an amount of time it takes to perform the verification process, relative to known braking calibration verification processes. It may be desirable to have a system and method that differs from those that are currently available.

BRIEF DESCRIPTION

In one or more embodiments, a vehicle braking calibration system includes a valve fluidly coupled with a vehicle braking system of a vehicle. The valve may move between an open position and a closed position to control an amount of a fluid that is directed out of the braking system. A sensor detects one or more characteristics of the fluid that is directed out of the braking system. A controller determines a state of the braking system based on the one or more characteristics of the fluid.

In another embodiment, a method includes controlling an amount of a fluid that is directed out of a vehicle braking system of a vehicle with a valve fluidly coupled with the vehicle braking system. The valve may move between an open position and a closed position. One or more characteristics of the fluid that is directed out of the braking system are detected with a sensor. A state of the braking system is determined with a controller having one or more processors based on the one or more characteristics of the fluid.

In another embodiment, a vehicle braking calibration system includes a valve fluidly coupled with a vehicle braking system and may control flow of a fluid out of the vehicle braking system. A sensor may detect one or more characteristics of the fluid that is directed out of the vehicle braking system. A controller may determine a pressure of the braking system based on the one or more characteristics of the fluid that are sensed. The controller may communicate the pressure of the braking system to an operator of a vehicle that includes the vehicle braking system without the operator leaving the vehicle.

BRIEF DESCRIPTION OF THE DRAWINGS

The inventive subject matter may be understood from reading the following description of non-limiting embodiments, with reference to the attached drawings, wherein below.

DETAILED DESCRIPTION

Figure 1:
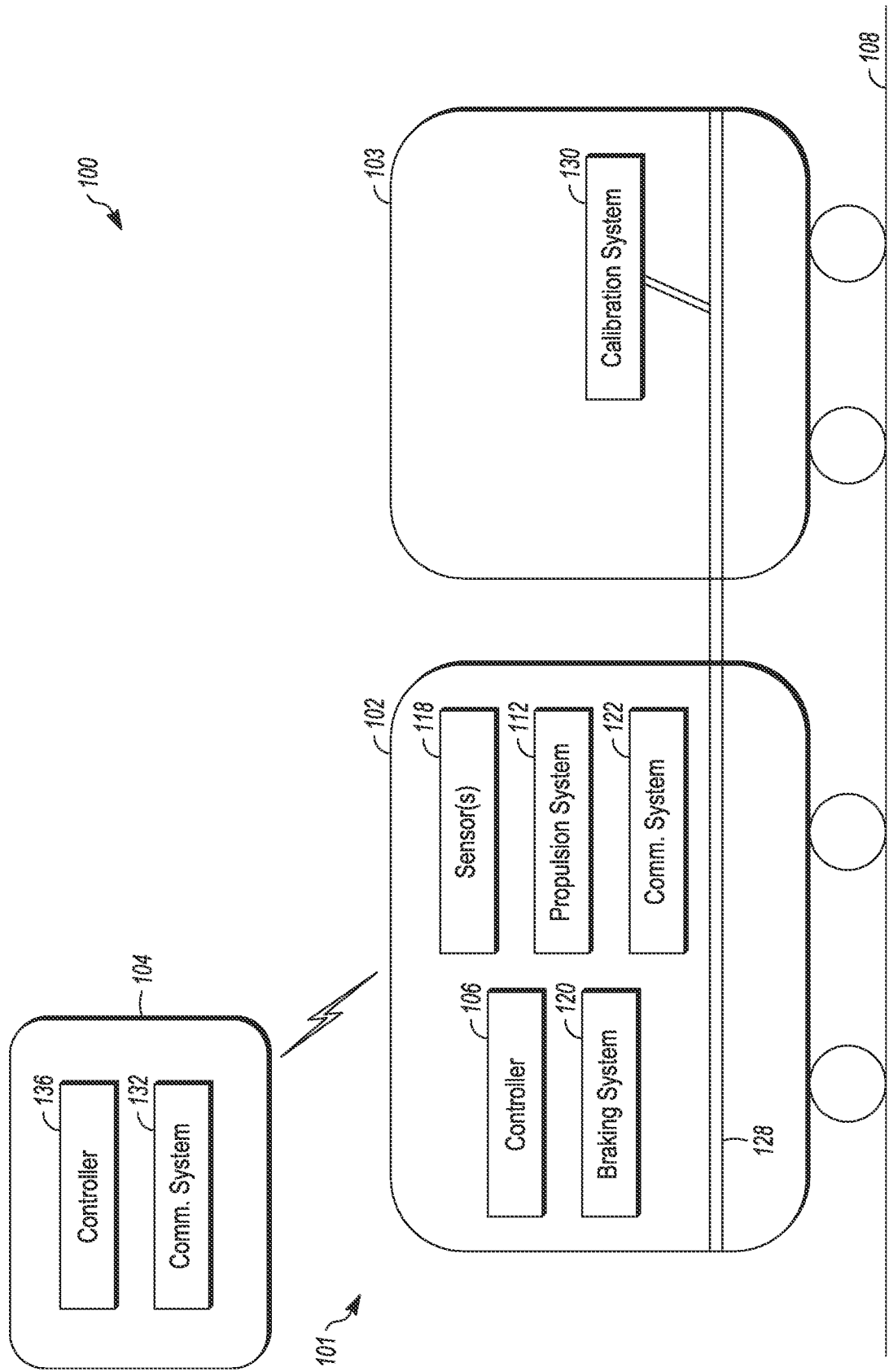
FIG. 1 illustrates one example of a vehicle system in accordance with one embodiment.

Embodiments of the subject matter described herein relate to a vehicle braking calibration system, and a method of determining a state of a braking system of a vehicle. The braking calibration system may include a valve fluidly coupled with a vehicle braking system to control an amount of fluid that is directed out of the braking system, a sensor that senses or otherwise detects characteristics of the fluid directed out of the braking system, and a controller that determines the state of the braking system based on the characteristics of the fluid. As one example, the characteristics of the fluid may be fluid pressure, temperature, viscosity, composition, a flow rate, or the like. The vehicle braking calibration system may be assembled with the vehicle, or alternatively may be retrofitted onto an existing vehicle system.

In one embodiment, the controller may control operation of the valve to move between a closed position and one or more open positions. The controller may be an onboard controller, or alternatively may be an off-board controller. The controller may automatically control operation of the valve by communicating a control signal to the valve via a wireless or wired pathway. Optionally, the controller may receive manual input from an operator and may control operation of the valve based on the received manual input.

The sensor may detect or otherwise sense the one or more characteristics of the fluid. The sensor may wirelessly communicate or communicate via a conductive pathway the sensed characteristics with the onboard and/or off-board controller, and the controller may determine the state of the braking system based on the characteristics. The state of the braking system may be determined to be a typical state or a fault state. For example, the fault state may indicate that the braking system is malfunctioning, and the typical state may indicate that the braking system is operating correctly.

The method of determining the state of the braking system may be completed by a controller (onboard and/or off-board the vehicle), and/or manually based on manual input received by the controller from the operator. This method may be done automatically. For example, the state of the braking system may be determined without the operator leaving the vehicle system, thereby improving the safety of the operator, and improving an amount of time to perform the determination process relative to a verification process that requires an operator to de-board the vehicle system.

While some embodiments described herein relate to rail vehicles, not all embodiments of the inventive subject matter are restricted to rail vehicles. One or more embodiments of the inventive subject matter may relate to other types or models of vehicles, such as automobiles, trucks, buses, mining vehicles, marine vessels, aircraft (manned or unmanned, such as drones), agricultural vehicles, or other off-highway vehicles. Additionally, the vehicles may be included in vehicle systems that may include two or more different types of vehicles that may operate as a common vehicle system and that may communicate with each other and/or the off-board control system. The vehicle system travels along the route, such as tracks, roads, highways, land-based paths, airborne paths, waterways, or the like. Optionally, the vehicle system may include two or more propulsion and/or non-propulsion vehicles in any order and/or in any combination.

FIG. 1 illustrates one example of a system 100 that includes a vehicle system 101 that is a rail vehicle system that includes two rail vehicles 102, 103, and which may communicate with an off-board control system 104. The vehicle system's vehicles may travel together along a route 108. In the illustrated embodiment, the vehicle 102 may be a propulsion generating vehicle, and the vehicle 103 may be a non-propulsion vehicle, such that the non-propulsion vehicle does not provide or contribute to propulsion efforts of the vehicle system. Optionally, the vehicle system may include two or more propulsion and/or non-propulsion vehicles in any order and/in any combination.

The vehicle system may include a controller 106, which may be referred to as an onboard controller. The onboard controller can represent hardware circuitry that includes and/or is connected with one or more processors, such as one or more microprocessors, field programmable gate arrays, integrated circuits, and/or the like, that perform operations described in connection with the onboard controller. The controller can represent or can include an engine control unit. The onboard controller may communicate with a propulsion system (not shown) of the vehicle. If the propulsion system includes an engine, the engine can be a fuel-consuming engine. Suitable fuels may include liquid fuels and/or gaseous fuels. Suitable liquid fuels may include one or more of diesel, gasoline, kerosene, alcohol, dimethyl ether, and the like. Suitable gaseous fuels may include one or more of natural gas (methane), hydrogen, ammonia, and the like. In some embodiments, rather than, or in addition to, methane another short chain hydrocarbon may be used.

The onboard controller can communicate with onboard and/or off-board components via a communication system 122. The communication system represents transceiving circuitry, one or more antennas, modems, or the like. In one or more embodiments, the communication system may receive and provide data signals to the onboard controller, to one or more wayside devices, to one or more systems onboard another vehicle (e.g., the vehicle 103) of the vehicle system, to another vehicle system, or the like. The communication system may be the same as or similar to other communication systems described herein.

The vehicle system includes a propulsion system 112 that operates to move the vehicle along the route. The propulsion system can represent one or more engines, battery packs, fuel cells, motors, transmissions, propellers, or the like, that generate power and/or propulsion to move the vehicle system. The propulsion system may extend between two or more different vehicles (e.g., propulsion-generating vehicles) of the vehicle system, and the different propulsion-generating vehicles may provide propulsion efforts to propel the vehicle system along the route. The onboard controller can communicate control signals with the propulsion system to control or change movement of the vehicle.

The vehicle system also includes a vehicle braking system 120 that operates to slow or stop movement of the vehicle system. A suitable braking system can include one or more of air brakes, friction brakes, motors (e.g., used for dynamic or regenerative braking), or the like, selected based at least in part on end use parameters. These braking systems may be disposed on one or more different vehicles of the vehicle system. In the illustrated embodiment, the braking system includes a braking system conduit 128 extending along and between the different vehicles of the vehicle system. The conduit may direct fluid, such as air, or the like, of the braking system to the different vehicles of the vehicle system to fluidly couple each of vehicles with the braking system.

In one or more embodiments, the vehicle system may include one or more different controllers having and/or connected to one or more processors that may control one or more systems of the vehicle system, such as the propulsion system and/or the vehicle braking system. For example, the onboard controller (e.g., the controller 106 of FIG. 1) may control one or more operating settings of the propulsion system, and another controller (not shown), may control settings of the braking system. The hardware and/or the software of the different controllers may the same in some instances, or may be different based on the system particulars to be controlled by the different controllers.

The vehicle system may include one or more powered components, such as an auxiliary system (not shown), that can represent one or more loads that consume some power of the vehicle system and may be disposed onboard one or more different vehicles of the system. The powered components can represent fans (e.g., blowers that cool parts of the propulsion system, blowers that cool braking resistors, pumps that force coolant to cool the engine or other components, etc.), heating and/or cooling systems that heat or cool an operator cab of the vehicle, or the like.

One or more sensors 118 of the vehicle system may sense characteristics of operation of the vehicles and/or environment, and output signals (e.g., wireless signals and/or signals that are conducted via one or more conductive pathways such as wires, cable, buses, etc.). In the illustrated embodiment, the sensors are disposed on the vehicle 102, but optionally one or more sensors may alternatively or additionally be disposed onboard the vehicle 103. The sensors may represent cameras, motion detectors, temperature detection sensors, chemical and/or poison detection sensors, positioning sensors, accelerometers, barometers, or the like. The sensors may sense characteristics of the vehicle, of the environment inside an area of the vehicle (e.g., inside a cab of the vehicle), of the environment outside of the vehicle, operating conditions of the vehicle, characteristics of a cargo that may be onboard and/or carried by the vehicle, characteristics of an operator and/or passenger onboard the vehicle, or the like.

The number of each of the components shown in onboard the vehicle 102 of FIG. 1 is used as one example. For example, multiples of the engine, the controller, the sensor (s), the generator, the alternator, and/or the propulsion system may be provided onboard one or more vehicles of the vehicle system, and may be distributed in two or more different vehicles of the vehicle system.

The off-board control system 104 communicates with the onboard controller of the vehicle via a communication system 132. The communication system represents transceiving circuitry, one or more antennas, modems, or the like. In one or more embodiments, the communication system may receive and provide data signals to the onboard controller. The communication system may be the same as or similar to other communication systems described herein.

The off-board control system includes a controller 136, which may be referred to herein as an off-board controller, that can represent hardware circuitry that includes and/or is connected with one or more processors that perform operations of the off-board control system. In one or more embodiments, the off-board controller can communicate with the onboard controller of the vehicle system to control one or more operations of the vehicle system. For example, the off-board controller can communicate with the onboard controller of the vehicle system to notify the vehicle system where the vehicle system is allowed to travel, how fast the vehicle system is allowed to travel, or the like.

In one embodiment, the off-board control system may represent a back-office server of a positive vehicle control (PVC) system. A PVC system is a control system in which a vehicle is allowed to move, and/or is allowed to move outside a designated restricted manner (such as above a designated penalty speed limit), only responsive to receipt or continued receipt of one or more signals (e.g., received from off-board the vehicle system) that meet designated criteria, the signals have designated characteristics (e.g., a designated waveform and/or content) and/or are received at designated times (or according to other designated time criteria) and/or under designated conditions. This is opposed to 'negative' vehicle control systems where a vehicle system is allowed to move unless a signal (restricting movement) is received. The back-office server may be a vital or a non-vital system such that data stored, contained, maintained, communicated between, or the like, may be vital (e.g., protected) and/or non-vital (e.g., non-protected) data. Alternatively, the off-board control system represents another computerized system that communicates with vehicles and/or vehicle systems described herein.

In one or more embodiments, the onboard and/or off-board controllers may include input and/or output devices (not shown) for use by an operator to manually control one or more operations, settings, or the like, of the controllers. In one or more embodiments, the onboard and/or off-board controllers may include a memory or storage system (not shown). For example, a memory can store information about the vehicle, the route, or the like.

In one embodiment, the vehicle system includes a vehicle braking calibration system 130. In the illustrated embodiment of FIG. 1, the calibration system is disposed onboard the vehicle 103, but alternatively may be disposed onboard the vehicle 102. Optionally, one or more calibration systems may be disposed onboard one or more different vehicles of the vehicle system.

Figure 2:
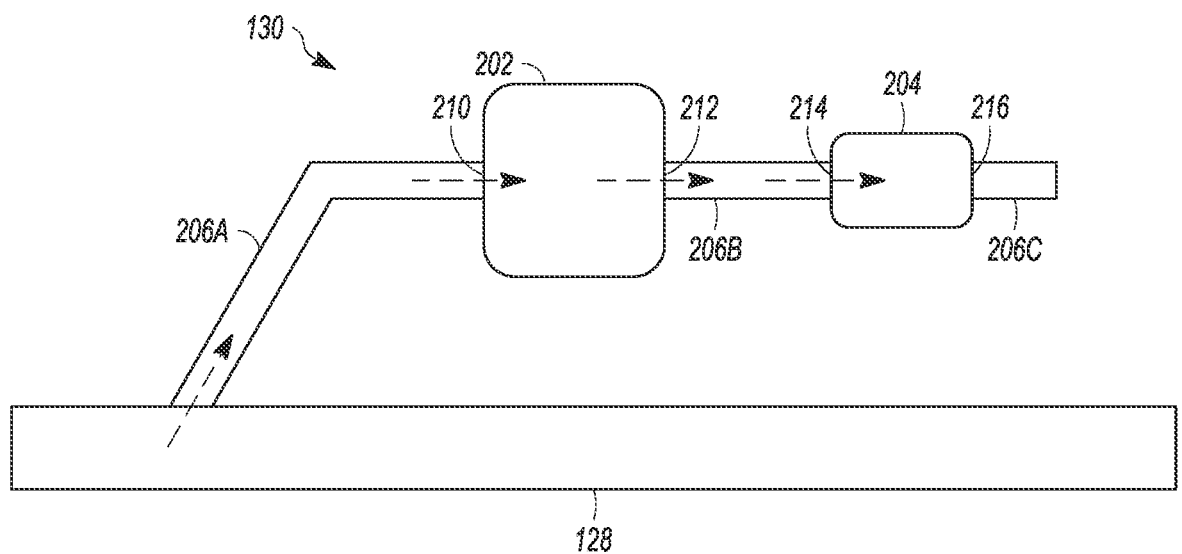
FIG. 2 illustrates one example of a braking calibration system in accordance with one embodiment.

FIG. 2 illustrates a magnified view of the vehicle braking calibration system in accordance with one embodiment. In one embodiment, the vehicle braking calibration system may be built onto and/or with the vehicle system during manufacture or assembly of the vehicle system. Optionally, the braking calibration system may be retrofitted to an existing braking system of a vehicle. For example, a manufactured or assembled vehicle system may include a braking system, and a braking calibration system may be coupled with an existing braking system or disposed onboard the existing vehicle system at a time after the vehicle system had been manufactured, built, or assembled.

The calibration system includes a valve 202 and a sensor 204. The valve and the sensor are fluidly coupled with each other and with the braking system conduit 128 via one or more conduits 206. A first conduit 206A directs a portion of the fluid out of the braking system conduit and toward the valve, and a second conduit 206B directs controls a portion of the fluid between the valve and the sensor. In one embodiment, a portion of the fluid may be directed out of the sensor via a third conduit 206C, or alternatively, the fluid may not be directed through and/or out of the sensor.

The valve moves between one or more open positions and a closed position to one or more characteristics of the fluid (e.g., an amount, a viscosity, a pressure, a flow rate, etc.) that is directed out of the braking system conduit of the braking system and toward the valve. For example, fluid is allowed to move out of the braking system conduit and through the valve via an inlet 210 and outlet 212 of the valve while the valve is in the open position. Alternatively, fluid is prohibited from moving through the valve while the valve is in the closed position. In one or more embodiments, the inlet of the valve may be controlled independently of or separate from the outlet. For example, the inlet may be controlled to a first open position and the outlet may be independently and/or separately controlled to a second open position that is different than the first open position. The different open positions of the inlet and/or outlet may control the one or more characteristics of the fluid that is directed into the valve via the inlet and out of the valve via the outlet.

In one embodiment, operation of the valve may be controlled by the onboard controller to move between the open and/or closed positions. The onboard controller may automatically control operation of the inlet and/or outlet of the valve. As one example, the operational commands may be communicated via one or more conductive pathways (e.g., wires, cables, buses) and/or by wireless communication between the onboard controller and the valve.

Optionally, an operator onboard the vehicle system may manually control operation of the valve. For example, the onboard controller may receive manual input from an operator of the vehicle system to control operation of the valve between the open and closed positions. Optionally, a controller of the braking system (not shown) may control operations of the valve, the off-board controller may direct the onboard controller how to operate the valve, an operator of the off-board controller may manually control operation of the valve via command messages communicated to the vehicle system via the off-board control, or the like.

In the illustrated embodiment, the sensor is fluidly coupled with the valve via the second conduit 206B, and includes an inlet 214 that directs the fluid out of the second conduit and into the sensor. Optionally, the sensor may be operably coupled with the valve (e.g., a surface of the sensor may be coupled with a surface of the valve) and the sensor may be disposed at a position proximate to the fluid to sense or detect one or more different characteristics of the fluid.

In one embodiment, the sensor may be an orifice that controls or limits a flow rate of the fluid, a pressure of the fluid, a viscosity of the fluid, or the like. As another example, the sensor may be thermometer or another thermal detection device that senses or detects a temperature of the fluid, a temperature of a surface of the valve, or the like. As another example, the sensor may be a chemical detection sensor or the like that may sense or detect a composition of the fluid and/or constituents within the fluid (e.g., fuel, water, metal particulate, carbon, soot, or the like). In one embodiment, the sensor of the calibration system may be separate from the sensors 118 of the vehicle system, or optionally may be one or more of the sensors.

The sensor may communicate the sensed and/or detected characteristics of the fluid, and may communicate the characteristics with the onboard controller, with the off-board controller, with an alternative off-board system, or the like. In one embodiment, the onboard controller may determine a state of the braking system based on the one or more characteristics of the fluid. For example, the onboard controller may determine that the braking system is in a fault state or in a typical state. The fault state may indicate that the braking system is malfunctioning (e.g., the pressure and/or flow rate of the fluid is below or less than a determined threshold), that the composition of the fluid is different than a target composition of the fluid, that the temperature of the fluid is outside of a determined temperature range (e.g., is less than a target temperature and/or is greater than a target temperature), or the like. Alternatively, the controller may determine that the braking system is in a typical state, such that the one or more characteristics of the fluid meet one or more target characteristics of the fluid. For example, the typical state may indicate that the braking system is operating correctly, that the fluid is the correct fluid composition, that the temperature of the fluid is within the determined temperature range, that the flow rate meets the flow rate determined threshold or is within the determined range, that the pressure of the fluid meets the determined pressure threshold or is within the determined range, or the like.

Figure 3:
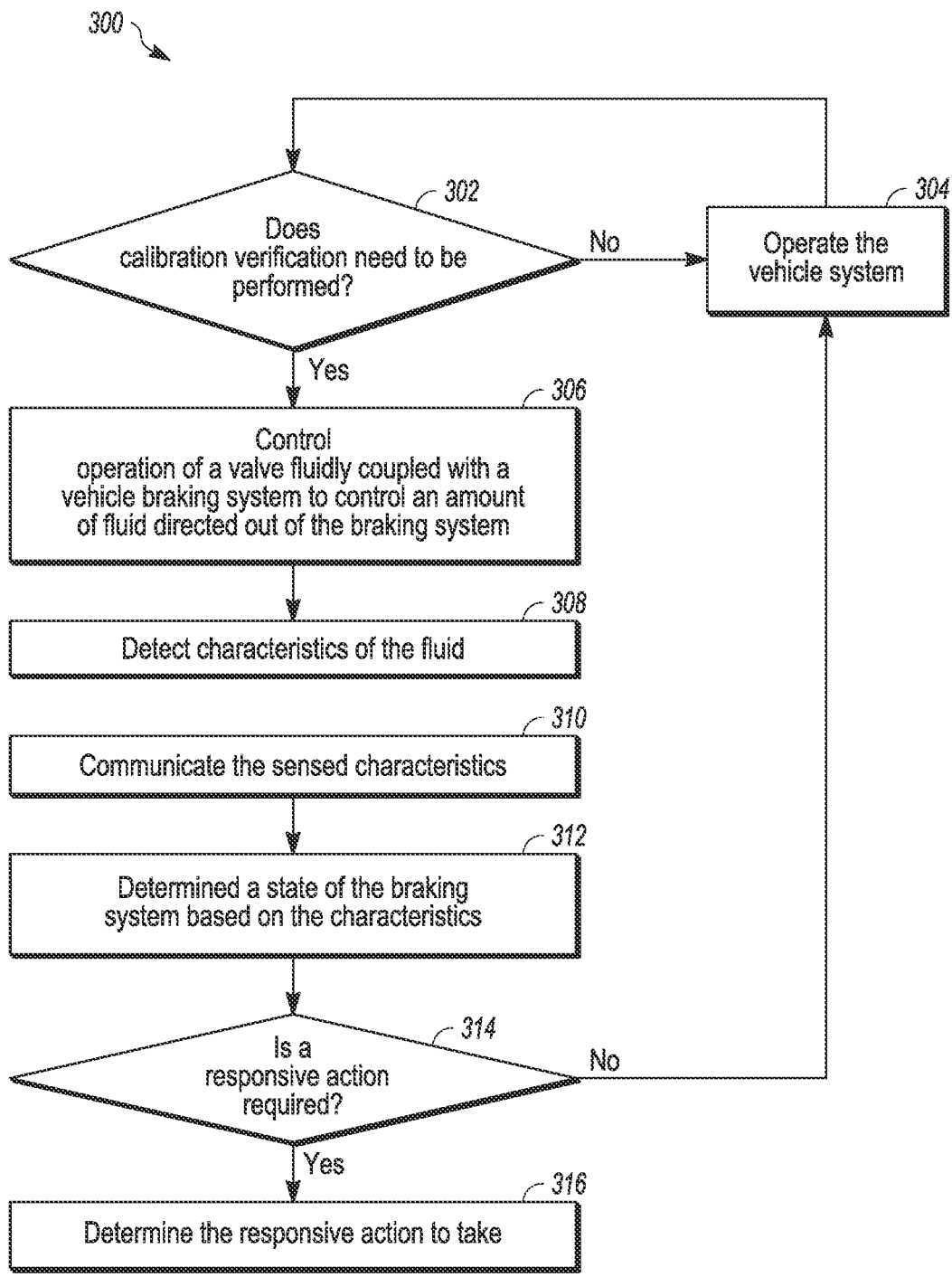
FIG. 3 illustrates a flowchart of one example of a method for determining a state of a braking system of a vehicle system in accordance with one embodiment.

With reference to FIGS. 1 and 2, FIG. 3 illustrates a flowchart of one example of a method 300 for determining a state of a braking system of a vehicle system in accordance with one embodiment. The operations described in connection with the method can be performed by the onboard controller, the off-board controller, an alternative control system, or the like, unless otherwise described herein.

At step 302, a determination is made if a calibration verification of the braking system needs to be performed. The calibration verification may be performed based on calibration criteria of the braking system, of the vehicle system, or the like. For example, the calibration criteria may include, but is not limited to, a speed of movement of the vehicle system, if the vehicle system is stopped and/or a length of time that the vehicle system has been stopped or substantially stationary, a location of the vehicle system (e.g., a position along the route, if the vehicle system is disposed in a yard or shed, etc.), a grade of the route, environmental conditions of the vehicle system, or the like. Optionally, the calibration verification may be performed based on a determined, or predetermined, schedule of operation (e.g., the vehicle system has traveled a determined, or predetermined, distance, a determined, or predetermined, amount of time has passed since a previous calibration verification, or the like). If the calibration of the braking system does not need to be verified, then flow of the method proceeds toward step 304, where the vehicle system is operated, and the flow returns toward step 302 for a predetermined length of time, until the vehicle system reaches a destination and/or stops movement, or the like.

If the calibration of the braking system needs to be verified, flow of the method proceeds toward step 306. At step 306, operation of a valve of the braking calibration system is controlled. The valve is fluidly coupled with the vehicle braking system to control an amount of fluid that is directed out of the braking system. The valve may be controlled to move between a closed position and one or more different open positions. In one or more embodiments, an inlet of the valve and an outlet of the valve may be independently controlled to control one or more flow characteristics of the fluid that is directed out of the braking system. The operation of the valve may be automatically controlled by a controller, such as onboard controller, a controller of the braking system, an off-board controller, or the like. Alternatively, the operation of the valve may be controlled based on an operator manually inputting control commands into an input device of the onboard and/or off-board controller to remotely and manually control operation of the valve. For example, the operator may remotely control the valve to move between the closed and one or more open positions while the operator remains onboard the vehicle, is positioned at the off-board control system, or the like.

At step 308, responsive to the valve moving from a closed position to an open position, one or more characteristics of the fluid may be sensed or otherwise detector by a sensor of the vehicle calibration system. The sensor of the braking calibration system may be calibrated prior to the sensor being disposed onboard the vehicle system. For example, the sensor may be a calibrated sensor, such that measurements of the characteristics of the fluid by the sensor meet or exceed a determined standard of accuracy.

In one embodiment, the sensor may be a calibrated orifice that controls or limits a flow rate of the fluid, a pressure of the fluid, a viscosity of the fluid, or the like. As another example, the sensor may be thermometer or another thermal detection device that senses or detects a temperature of the fluid, a surface temperature of the valve, or the like. As another example, the sensor may be a chemical detection sensor or the like that may sense or detect a composition of the fluid and/or constituents within the fluid (e.g., fuel, water, metal particulate, carbon, soot, or the like).

At step 310, the characteristics of the fluid sensed or otherwise detected by the sensor are communicated from the sensor to the controller. In one embodiment, the sensed characteristics may be communicated via a conductive pathway (e.g., a wired connection, or the like), and/or the characteristics may be wirelessly communicated. The sensed characteristics may be communicated to the onboard controller, to the off-board controller by way of the onboard controller, directly with the off-board controller, or the like.

At step 312, a state of the braking system is determined based on the characteristics. In one embodiment, the onboard controller may determine the state of the braking system. Optionally, the off-board controller may determine the state of the braking system. Optionally, the operator (e.g., onboard the vehicle system or positioned at the off-board control system) may determine the state of the braking system.

The state may be a fault state of the braking system or a typical state of the braking system. The fault state may indicate that the braking system is malfunctioning (e.g., the pressure and/or flow rate of the fluid is below or less than a determined threshold), that the composition of the fluid is different than a target composition of the fluid, that the temperature of the fluid is outside of a determined temperature range (e.g., is less than a target temperature and/or is greater than a target temperature), or the like. Alternatively, the braking system may be determined to have or be in a typical state, such that the one or more characteristics of the fluid meet one or more target characteristics of the fluid. For example, the typical state may indicate that the braking system is operating correctly, that the fluid is the correct fluid composition, that the temperature of the fluid is within the determined temperature range, that the flow rate meets the flow rate determined threshold or is within the predetermined range, that the pressure of the fluid meets the predetermined pressure threshold or is within the predetermined range, or the like.

In one embodiment, the onboard controller may determine the state of the vehicle braking system and may communicate the determined state with the off-board controller. The determination may be done automatically. Optionally, the controller may communicate the determined state with an operator onboard the vehicle system, such as by displaying a notification on an output device of the vehicle system, or the like. For example, the controller may communicate the one or more characteristics of the fluid and/or the state of the braking system to the operator onboard the vehicle system without the operator leaving the vehicle system.

At step 314, a decision is made whether a responsive action is required. A responsive action may be required based on the state of the braking system. The responsive action may include, but is not limited to, changing an operating setting of a system of the vehicle system (e.g., change a setting of the propulsion system, turn on and/or off power to one or more auxiliary electronics, or the like), scheduling maintenance and/or repair of the vehicle (e.g., outside of a determined maintenance schedule), communicating an alert with an operator onboard the vehicle system and/or the off-board control system), or the like. In one or more embodiments, the controller may determine whether a responsive action is required based on a history of the characteristics of the fluid or a history of the state of the braking system. The history of the characteristics of the fluid and/or the state of the braking system may be stored within a memory of the vehicle system, a memory of the off-board control system, or the like.

If a responsive action is not required, flow of the method proceeds toward step 304, and operation of the vehicle system may proceed. Alternatively, if a responsive action is required, flow of the method proceeds toward step 316. At step 316, the responsive action to be taken is determined. In one embodiment, the onboard controller may determine the responsive action (e.g., such as to schedule un-scheduled maintenance of the vehicle system), and may initiate a maintenance request. Optionally, the controller may determine the responsive action to be taken, and may communicate instructions to an operator onboard and/or off-board the vehicle system directing the operator to take the determined responsive action. Optionally, the operator may determine the responsive action that should be taken.

In one or more embodiments of the subject matter described herein, a vehicle braking calibration system includes a valve fluidly coupled with a vehicle braking system of a vehicle. The valve may move between an open position and a closed position to control an amount of a fluid that is directed out of the braking system. A sensor detects one or more characteristics of the fluid that is directed out of the braking system. A controller determines a state of the braking system based on the one or more characteristics of the fluid.

Optionally, the one or more characteristics includes one or more of a pressure of the fluid, a temperature of the fluid, a viscosity of the fluid, a composition of the fluid, or a flow rate of the fluid. Optionally, the controller may automatically control operation of the valve to move between the open position and the closed position based on one or more conditions of the vehicle. Optionally, the controller may determine whether the braking system is in a fault state or a typical state. The controller may change one or more operating settings of the vehicle responsive to determining that the braking system is in the fault state. Optionally, the controller may receive manual input and control operation of the valve to move between the open position and the closed position based on the manual input. Optionally, the controller may communicate the state of the braking system to an off-board controller. Optionally, the controller may determine a responsive action based on the state of the braking system. The responsive action may include one or more of changing an operating settings of one or more systems of the vehicle, scheduling maintenance or repair of the vehicle, or communicating an alert with one or more of an off-board controller or an operator onboard the vehicle. Optionally, the controller may automatically control operation of the valve to determine the state of the braking system based on a determined schedule of operation. Optionally, the valve and the sensor may be retrofitted with an existing braking system of the vehicle. Optionally, the vehicle braking calibration system may include a memory that may store one or more of the one or more characteristics of the fluid or the state of the braking system. The controller may determine a responsive action based on a history of the one or more characteristics of the fluid or the state of the braking system. Optionally, the sensor may wirelessly communicate the one or more characteristics with the controller. Optionally, the sensor may be a calibrated orifice. Optionally, the controller may communicate one or more of the one or more characteristics of the fluid or the state of the braking system to an operator of the vehicle without the operator leaving the vehicle.

In one or more embodiments of the subject matter described herein, a method includes controlling an amount of a fluid that is directed out of a vehicle braking system of a vehicle with a valve fluidly coupled with the vehicle braking system. The valve may move between an open position and a closed position. One or more characteristics of the fluid that is directed out of the braking system are detected with a sensor. A state of the braking system is determined with a controller having one or more processors based on the one or more characteristics of the fluid.

Optionally, the method may include controlling the amount of the fluid that is directed out of the vehicle braking system responsive to determining whether the vehicle system meets one or more calibration criteria. Optionally, the one or more characteristics may include one or more of a pressure of the fluid, a temperature of the fluid, a viscosity of the fluid, a composition of the fluid, or a flow rate of the fluid. Optionally, the method may include automatically controlling operation of the valve with the controller to move between the open position and the closed position based on one or more conditions of the vehicle. Optionally, the method may include determining whether the braking system is in a fault state or a typical state, and changing one or more operating settings of the vehicle responsive to determining that the braking system is in the fault state. Optionally, the method may include receiving manual input by the controller and controlling operation of the valve to move between the open position and the closed position based on the manual input. Optionally, the method may include communicating the state of the braking system from the controller to an off-board controller.

Optionally, the method may include determining a responsive action based on the state of the braking system. The responsive action may include one or more of changing an operating setting of one or more systems of the vehicle, scheduling maintenance or repair of the vehicle, or communicating an alert with one or more of an off-board controller or an operator onboard the vehicle. Optionally, the method may include automatically controlling operation of the valve with the controller based on a determined schedule of operation. Optionally, the valve and the sensor may be retrofitted with an existing braking system of the vehicle. Optionally, the method may include storing one or more of the one or more characteristics of the fluid or the determined state of the braking system with a memory. A responsive action may be determined based on a history of the one or more characteristics of the fluid or the state of the braking system. Optionally, the method may include wirelessly communicating the one or more characteristics from the sensor with the controller.

In one or more embodiments of the subject matter described herein, a vehicle braking calibration system includes a valve fluidly coupled with a vehicle braking system and may control flow of a fluid out of the vehicle braking system. A sensor may detect one or more characteristics of the fluid that is directed out of the vehicle braking system. A controller is configured may determine a pressure of the braking system based on the one or more characteristics of the fluid that are sensed. The controller may communicate the pressure of the braking system to an operator of a vehicle that includes the vehicle braking system without the operator leaving the vehicle.

In one embodiment, the controllers or systems described herein may have a local data collection system deployed and may use machine learning to enable derivation-based learning outcomes. The controllers may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used making determinations, calculations, comparisons and behavior analytics, and the like.

In one embodiment, the controllers may include a policy engine that may apply one or more policies. These policies may be based at least in part on characteristics of a given item of equipment or environment. With respect to control policies, a neural network can receive input of a number of environmental and task-related parameters. These parameters may include, for example, operational input regarding operating equipment, data from various sensors, location and/or position data, and the like. The neural network can be trained to generate an output based on these inputs, with the output representing an action or sequence of actions that the equipment or system should take to accomplish the goal of the operation. During operation of one embodiment, a determination can occur by processing the inputs through the parameters of the neural network to generate a value at the output node designating that action as the desired action. This action may translate into a signal that causes the vehicle to operate. This may be accomplished via back-propagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes, which may be weighed relative to each other.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and clauses, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and clauses, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The clauses define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A vehicle braking calibration system, comprising:
   a first conduit coupled with a brake pipe of a braking system of a vehicle;
   a valve fluidly coupled with the brake pipe by the first conduit, the valve configured to move between an open position and a closed position during a calibration event of the braking system to control an amount of fluid that is directed out of the brake pipe through the valve during the calibration event, wherein the valve is configured to be in the open position during the calibration event and is configured to be in the closed position outside of the calibration event;
   a second conduit connected with the valve;
   a sensor connected with the second conduit and configured to receive the fluid directed out of the valve via the second conduit, the sensor configured to detect a characteristic of the fluid that is directed out of the brake pipe; and
   a controller configured to:
      determine a state of the brake pipe based on the detected characteristic of the fluid and a target characteristic of the fluid; and
      determine a responsive action of one or more of the vehicle or the braking system of the vehicle based on the determined state.

2. The vehicle braking calibration system of claim 1, wherein the characteristic of the fluid includes one or more of a pressure of the fluid, a temperature of the fluid, a viscosity of the fluid, a composition of the fluid, or a flow rate of the fluid.

3. The vehicle braking calibration system of claim 1, wherein the controller is configured to automatically control operation of the valve to move between the open position and the closed position based on one or more conditions of the vehicle.

4. The vehicle braking calibration system of claim 1, wherein the determined state of the brake pipe is a fault state or a typical state, and wherein the controller is configured to change one or more operating settings of the vehicle responsive to determining that the brake pipe is in the fault state.

5. The vehicle braking calibration system of claim 1, wherein the controller is configured to receive manual input and to control operation of the valve to move between the open position and the closed position based on the manual input.

6. The vehicle braking calibration system of claim 1, wherein the responsive action includes one or more of a changing an operating setting of one or more systems of the vehicle, scheduling maintenance or repair of the vehicle, or communicating an alert with one or more of an off-board controller or an operator onboard the vehicle.

7. The vehicle braking calibration system of claim 1, wherein the controller is configured to automatically control operation of the valve to determine the state of the brake pipe based on a determined schedule of operation.

8. The vehicle braking calibration system of claim 1, wherein the valve and the sensor are configured to be retrofitted with an existing braking system of the vehicle.

9. The vehicle braking calibration system of claim 1, further comprising a memory configured to store the characteristic of the fluid or the state of the brake pipe, wherein the controller is configured to determine the responsive action based on a history of the characteristic of the fluid or the state of the brake pipe.

10. The vehicle braking calibration system of claim 1, wherein the sensor is a calibrated orifice.

11. The vehicle braking calibration system of claim 1, wherein the controller is configured to communicate the characteristic of the fluid or the state of the brake pipe to an operator of the vehicle without the operator leaving the vehicle.

12. A method comprising:
   controlling an amount of a fluid that is directed out of a brake pipe of a braking system of a vehicle with a valve fluidly coupled with the brake pipe by a first conduit, the valve configured to move between an open position and a closed position during a calibration event of the braking system, wherein the valve is configured to be in the open position during the calibration event and is configured to be in the closed position outside of the calibration event;
   directing the fluid out of the valve and through a second conduit connected with the valve;
   detecting a characteristic of the fluid that is directed out of the valve via the second conduit with a sensor connected with the second conduit;
   determining a state of the brake pipe with a controller having one or more processors based on the characteristic of the fluid and a target characteristic of the fluid; and
   determining a responsive action of one or more of the vehicle or the braking system of the vehicle based on the determined state.

13. The method of claim 12, further comprising controlling the amount of the fluid that is directed out of the brake pipe responsive to determining whether the braking system of the vehicle meets one or more calibration criteria.

14. The method of claim 12, further comprising automatically controlling operation of the valve with the controller to move between the open position and the closed position based on one or more conditions of the vehicle.

15. The method of claim 12, further comprising determining whether the brake pipe is in a fault state or a typical state, and changing one or more operating settings of the vehicle responsive to determining that the brake pipe is in the fault state.

16. The method of claim 12, further comprising receiving manual input by the controller, and controlling operation of the valve to move between the open position and the closed position based on the manual input.

17. The method of claim 12, wherein the responsive action includes one or more of a changing an operating setting of one or more systems of the vehicle, scheduling maintenance or repair of the vehicle, or communicating an alert with one or more of an off-board controller or an operator onboard the vehicle.

18. The method of claim 12, further comprising automatically controlling operation of the valve with the controller based on a determined schedule of operation.

19. The method of any claim 12, further comprising storing the characteristic of the fluid or the determined state of the brake pipe with a memory, and determining the responsive action based on a history of the characteristic of the fluid or the state of the brake pipe.

20. A vehicle braking calibration system comprising:
a first conduit coupled with a brake pipe of a braking system of a vehicle;
a valve fluidly coupled with the brake pipe by the first conduit, the valve configured to move between a closed position and one or more open positions to control flow of a fluid out of brake pipe during a calibration event of the braking system, wherein the valve is configured to be in one of the one or more open positions during the calibration event and is configured to be in the closed position outside the calibration event;
a second conduit coupled with the valve;
a sensor connected with the second conduit and configured to receive the fluid directed out of the valve via the second conduit, the sensor configured to detect one or more characteristics of the fluid that is directed out of the brake pipe; and
a controller configured to determine a pressure of the fluid of the brake pipe based on the one or more characteristics of the fluid that are sensed, the controller configured to communicate the pressure of the brake pipe to an operator of the vehicle without the operator leaving the vehicle.

* * * * *